United States Patent Office 3,458,148
Patented July 29, 1969

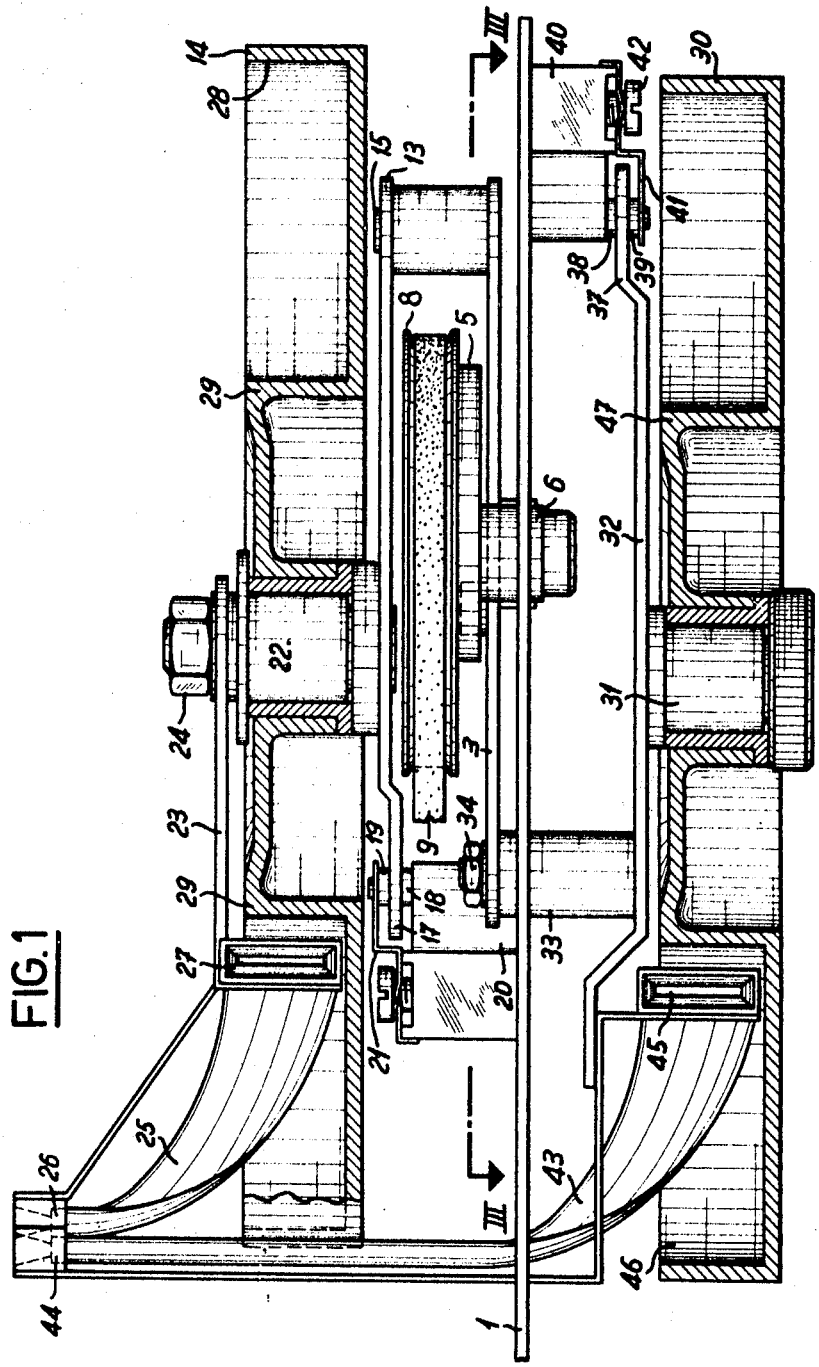
July 29, 1969    M. NEUMEISTER ET AL    3,458,148
ARRANGEMENT FOR THE REWINDING OF A WOUND STRIP
Filed Jan. 31, 1967    3 Sheets-Sheet 1
INVENTORS
MARTIN NEUMEISTER
BOB MOUISSIE
BY
*Emary L. Groff*
ATTORNEY

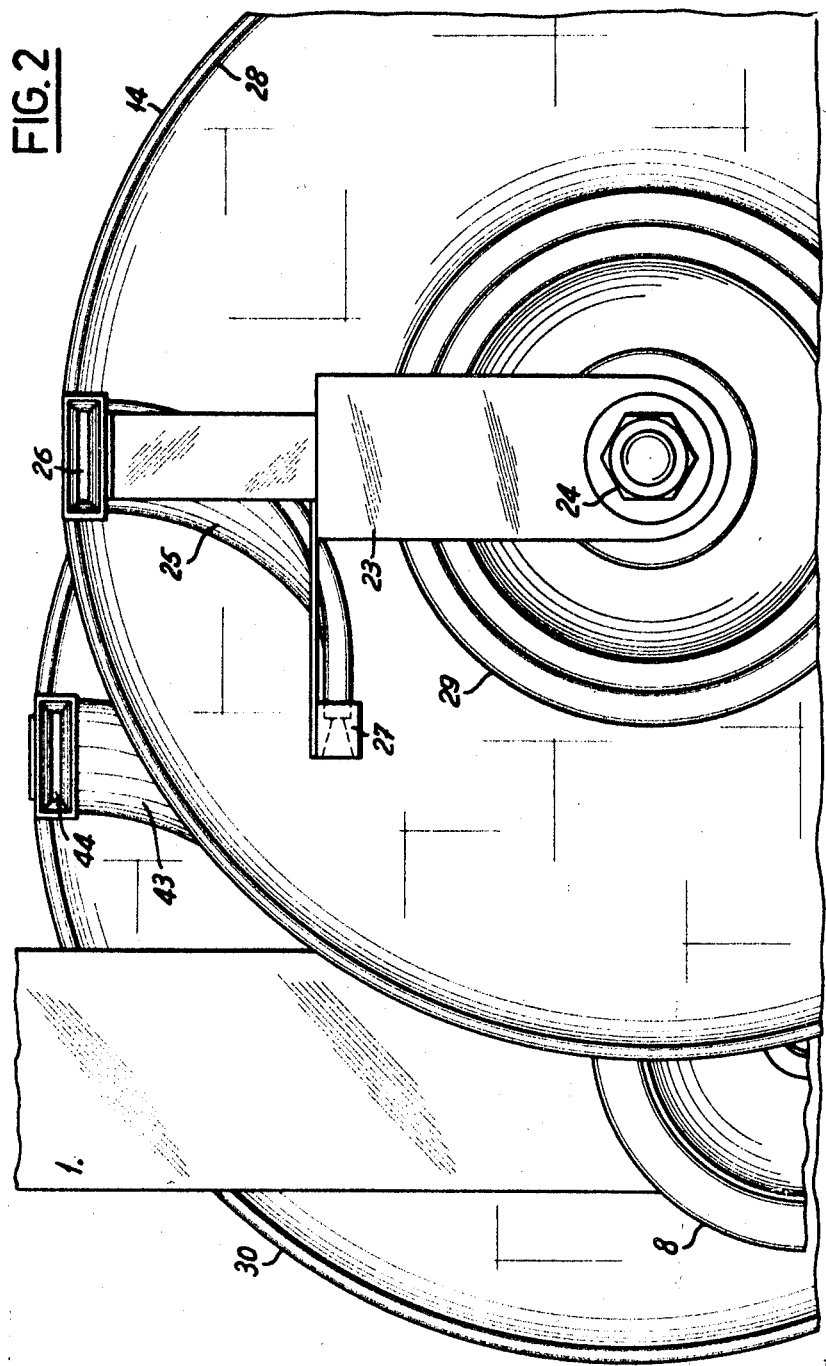

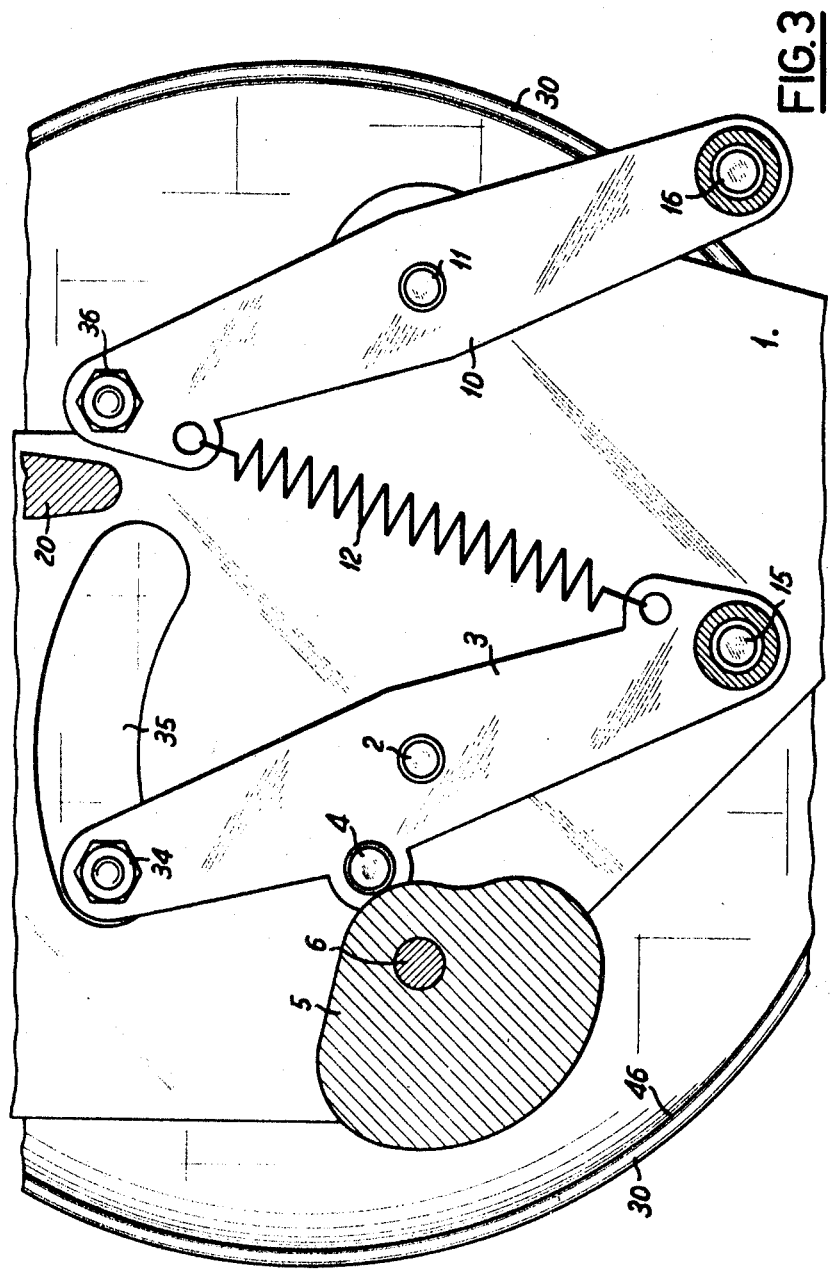

3,458,148
ARRANGEMENT FOR THE REWINDING OF A WOUND STRIP
Martin Neumeister and Bob Mouissie, Yverdon, Vaud, Switzerland, assignors to Paillard S.A., Sainte-Croix, Vaud, Switzerland, a corporation of Switzerland
Filed Jan. 31, 1967, Ser. No. 612,971
Claims priority, application Switzerland, Feb. 14, 1966, 2,107/66
Int. Cl. B65h *17/48;* G03b *23/00*
U.S. Cl. 242—55.21
4 Claims

ABSTRACT OF THE DISCLOSURE

An arrangement for temporarily storing a strip such as a kinematographic film as soon as it has been projected and before being rewound, said arrangement including two carriers moving in superposed planes and adapted to be shifted alternately between a film-feeding station and a film-rewinding station; said stations are common to both carriers and cooperate alternately with each of the latter so that the unwound film fed into one carrier is shifted therewith towards the film-rewinding station while the other carrier returns empty towards the film-feeding station.

---

In certain technical fields, chiefly those of kinematographic apparatus and of magnetic recording apparatus, it is often necessary to rewind a strip, film or tape after it has passed through the apparatus. Said rewinding requires a somewhat substantial part of the operator's time and leads, for instance in the case of a kinematographic projection, to undesirable interruptions in the actual projecting procedure.

In order to eliminate such a drawback, it has been already proposed to resort to apparatus comprising a number of feed spools and an equal number of take up spools. Each pair of cooperating spools is adapted to be shifted so as to bring a film first into position for projection and thenafter, when the projection is finished, to return it into a position for which its rewinding may be performed during the projection of another film.

It has also been proposed to design a kinematographic projector in a manner such that it can carry a plurality of feed spools, said projector being provided with means producing, during the reception of one film, the return of another preceedingly projected film. Thus, it is possible to ensure the projection of a succession of different films in a practically uninterrupted manner, the rewinding of any film which has just been projected being performed during the projection of the next film.

The present invention relates to receiving means adapted for use with such a projecting apparatus, said receiving means being however applicable generally to the reception of any strip of a maximum predetermined length, so as to thereafter permit the rewinding of the strip.

The present invention covers an arrangement for receiving a strip of a predetermined maximum length, temporarily storing it and returning it to its original wound position.

According to the invention, said arrangement includes two receiving sections carried on a common frame, each of said sections being adapted to be shifted from a first strip-receiving position into a second position corresponding to the storage or restoration of the strip, while a mechanism controls the movements of said receiving sections in a manner such that one of the sections may be in its storage or restoration position when the other is in its receiving position and conversely.

The accompanying drawings illustrate by way of example and in a non-limiting sense a preferred embodiment of the invention. In said drawings:
FIG. 1 is a partial sectional view of said embodiment.
FIG. 2 is a partial plan view thereof.
FIG. 3 is a horizontal cross-section thereof through line III—III of FIG. 1.

The arrangement illustrated is carried by a supporting plate 1 to which is pivotally secured at 2 a lever 3. Said lever is provided with a lateral projection 4 cooperating with a cam 5 revolving round a pivot 6 carried by said supporting plate 1. Said cam 5 is rigid with a wheel 8 adapted to be driven into rotation by a notched or corrugated belt 9.

As best shown in FIGURE 3, the supporting plate 1 carries a second lever 10 pivotally secured thereto at 11 and one end of which is connected with the first-mentioned lever 3 by a spring 12 which has for its object to urge the projection 4 against the cam 5.

A carrier plate 13 carries a drum 14 and is pivotally secured to the ends of the two levers 3 and 10 as illustrated at 15 and 16 respectively so as to form therewith a parallel motion. In order to relieve the stress exerted on the pivotal axes 15 and 16, said plate 13 is slidingly held along its edge 17 opposed to the side which is pivotally secured to said levers 3 and 10. Said edge 17 slides in fact between two superposed shoes 18 and 19, of which the lower shoe 18 is secured to a stud 20 carried by the supporting plate 1, whereas the higher shoe 19 is carried by an elastic blade 21 secured by a screw to said first-mentioned stud 20.

The carrier plate 13 carries a pivot 22 around which a drum 14 is freely and revolvably carried. The upper end of said pivot 22 projects above the hub of the drum 14 so as to allow the securing thereto of a bracket 23 by means of a nut 24, said bracket carrying a guiding member 25 forming a shaped channel of a rectangular cross-section. Said guiding member is twisted so that the upper input end 26 of the channel shows a vertical axis while its output end 27 shows a horizontal axis, said output end 27 opening into the annular channel separating the inner and outer walls of the annular trough formed by the drum 14. Said drum is adapted to receive an elongated strip such as a tape or a film entering the guiding member 25 through its input end 26. By reason of the twist assumed by the channel in said guiding member, said elongated strip is fed into the trough between the inner wall or hub 29 of the drum 14 and the inner surface of the outer wall 28 of said drum and is urged towards said outer wall. The strip engages the inner surface of said outer wall and frictionally drives the drum 14 into rotation. Since the latter revolves freely around its pivot 22, the inner surface of said outer wall of the drum quickly assumes a speed equal to that of the outermost convolution of the elongated strip or the like member which forms a succession of convolutions housed inside said drum.

A second receiving station is formed by the drum 30 located underneath the supporting plate 1 and pivoting freely on a pivot 31 rigid with a further carrier plate 32. Said plate 32 is adapted to pivot over the ends of the levers 3 and 10 which are subjected to parallel motion, which ends are opposite those carrying the pivotal axes 15 and 16. For this purpose, the lever 3 is provided with an opening inside which is fitted an adjusting pin 33 secured in position on said lever by a nut 34. Said pin passes through a slot 35 in the supporting plate 1, which slot extends along an arcuate line concentric with the pivot 2 carrying the lever 3. The pivotal connection between the carrier plate 32 and the lever 10 is obtained in a similar manner by means of a pin which is not visible in FIG. 1 and which is secured by a nut 36.

As in the case of the first receiving section formed by the drum 14, the plate 32 carrying the second receiving station is provided with an edge 37 held slidingly between two superposed shoes 38 and 39 secured respectively to a stud 40 rigid with the supporting plate 1 and to a spring blade 41 secured to said stud by a screw 42.

The drum 30 is associated with a guiding member 43 similar to the guiding member 25. The upper input end 44 of said guiding member 43 is disposed side by side with the input end 26 of the guiding member 25. The output end 45 of said guiding member 43 opens into the drum 30 between the outer wall 46 and the hub or inner wall 47 of the annular trough formed by said drum, which hub is fitted over the pivot 31.

For the position illustrated in the drawing, the input end 26 of the guiding member 25 lies in front of an opening from which is fed an elongated member or strip such as a film, said opening not being shown in the drawing. The two drums 14 and 30 thus occupy the relative positions illustrated in FIG. 2 in which the drum 14 is ready to receive the strip, while the drum 30 occupies the position in which it feeds out the film to be restored into its original wound condition. The input end 44 of the guiding member 43 associated with the drum 30 is then positioned in front of an arrangement, not illustrated, which is adapted to provide for the rewinding of said film.

The arrangement of the drum 30 with respect to the motion-picture projection unit as a whole, is similar to that described in FIGURES 9 and 10 of U.S. Patent No. 3,342,541, with the drum 14 receiving a film coming from the projection channel of the apparatus, while another film is being unwound from the drum 30, to be rewound in one of the cases in the storage device of the apparatus disclosed in said patent.

The film carried inside the drum 30 may thus be rewound while another film loaded in the drum 14 is being projected. When the projection of said other film is completed and simultaneously the rewinding of the film previously carried in the drum 14 is also completed, the cam 5 is rotated through one half revolution by the wheel 8 and belt 9 whereby the lever 3 is caused to rock against the action of the spring 12 until its end carrying the nut 34 reaches a point lying substantially in registry with the end of the slot 35 opposite that which it previously occupied, as illustrated in FIG. 3. Since the levers 3 and 10 are both pivotally secured to the carrier plate 13, said two levers pivot simultaneously whereby the drum 14 is shifted towards the left-hand side of FIG. 2.

At the same time, the drum 30 which is controlled by the opposite ends of said levers 3 and 10 is shifted towards the right-hand side of FIG. 2. The amplitude of the movements of the two drums are equal so that after being shifted, the input end of one of the guiding members enters the position previously occupied by the input end of the other guiding member and conversely. Thus, each of the guiding members is located alternately in registry with the film-feeding means and with the film-rewinding means.

Since the drums 14 and 30 are shifted along arcuate lines of opposite curvatures, the radii of which are defined by the distances separating the pivot 2 of the lever 3 from the points at which the corresponding carrier plates 13 and 32 are secured to the ends of said lever, the crossing of the input ends 26 and 44 of the guiding members 25 and 43 is performed without any difficulty when the drums 14 and 30 pass out of one of their positions into their other position.

In order to facilitate the rotary movement of each drum while the film carried by it is being rewound, it is of advantage to provide the inner wall of said drum surrounding the hub with a coat having a high coefficient of friction with reference to the film. This is provided because the inner convolutions have a tendency to close around the hub, when the film is being drawn out of the drum and, when said convolutions reach a position in contacting relationship with the inner wall of the drum, they draw said drum into rotation. As soon as the latter has acquired a sufficient speed the film may be drawn out without any frictional sliding contact between the film and the drum.

The arrangement described is extremely advantageous in its application to kinematographic projecting apparatus, but it is obvious that it may also be used with considerable interest in all cases where it is necessary to introduce into a cooperating arrangement an elongated member of a predetermined maximum length, said elongated member being thenafter removed while a similar elongated member is fed in its turn into the arrangement. Obviously, the drums 14 and 30 may be replaced by spools having a horizontal axis of rotation. In such a case, the means producing an exchange between the positions of said spools would be substantially more intricate than those provided in the embodiment described.

We claim:
1. A device for receiving and temporarily storing a strip of given maximum length, particularly a motion picture film which is being fed out of a film feeding station and then fed into a film rewinding station, and device comprising a pair of freely rotatable drums, one drum winding a projected film from said film feeding station while the other drum is unwinding a temporarily stored film into said film rewinding station, a film guide member for each of said drums, each said guide member including an inlet and outlet end, the outlet end of each said member disposed within said drum, means for alternately shifting said drums and guides so that the inlet end of one of said guides occupies the position previously occupied by the inlet end of the other guide and conversely, thereby permitting simultaneous recovery of one projected film and the rewinding of a previously recovered film.

2. A device according to claim 1, wherein said winding and unwinding drums are disposed horizontally one above the other, with the axes of rotation of each of said drums being parallel to the vertical direction of the inlet ends of the guide members.

3. A device according to claim 2, wherein each of the drums includes a hub covered with a coating material having a high coefficient of friction with respect to the film, so that said film drives said drum in rotation when said film is fed tangentially relative to said hub.

4. A device according to claim 1 wherein said means for alternately shifting said drums and guides includes a drive wheel, a cam integral with said drive wheel, first and second pivotally mounted levers resiliently connected to each other, means connecting each of said levers with each of said drums, and cam engaging said first lever whereby upon actuation of said drive wheel said cam causes said first lever to pivot and shift said drums and guides to their alternate positions.

References Cited

UNITED STATES PATENTS

| 1,134,664 | 4/1915 | Bingham | 242—55.21 |
| 2,673,734 | 3/1954 | Reza-bek et al. | 242—55.21 |
| 2,892,899 | 6/1959 | Connell | 242—55.21 XR |

FOREIGN PATENTS

| 559,606 | 6/1923 | France. |

BILLY S. TAYLOR, Primary Examiner

U.S. Cl. X.R.

352—125